US006525641B1

(12) United States Patent
Frank

(10) Patent No.: US 6,525,641 B1
(45) Date of Patent: Feb. 25, 2003

(54) DEFROST ON DEMAND THERMOSTAT

(75) Inventor: James P. Frank, Rock Falls, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/439,888

(22) Filed: Nov. 12, 1999

Related U.S. Application Data

(60) Provisional application No. 60/154,998, filed on Sep. 21, 1999.

(51) Int. Cl.[7] ........................ H01H 37/54; H01H 37/12; H01H 5/20

(52) U.S. Cl. ........................ 337/365; 337/368; 337/319; 200/407; 200/448

(58) Field of Search ................................ 337/298, 306, 337/309, 311, 318–323, 327, 330, 332, 382, 383, 390–396, 398, 114–119, 333, 343, 362–368; 200/406, 407, 448, 460, 461; 29/623

(56) References Cited

U.S. PATENT DOCUMENTS 3,065,323 A * 11/1962 Grimshaw .................. 200/140
3,139,500 A 6/1964 Fallon et al.
3,189,703 A * 6/1965 Chapin et al. ................ 200/67
3,530,419 A 9/1970 Hire
3,648,214 A * 3/1972 Slonneger ................... 337/311
3,648,478 A * 3/1972 Linstromberg ............... 62/157
4,163,129 A * 7/1979 Rossi et al. ................ 200/81.4
4,166,268 A 8/1979 Beck
4,206,344 A 6/1980 Fischer et al.
4,224,488 A * 9/1980 Rossi ....................... 200/67 A
4,325,046 A 4/1982 Burch
4,339,738 A 7/1982 Colavecchio
4,490,708 A * 12/1984 Thompson et al. ......... 337/320
4,510,479 A * 4/1985 Merchant ..................... 337/91
4,510,480 A 4/1985 Rossi et al.
4,615,179 A * 10/1986 Chiu et al. .................... 62/129
5,142,261 A 8/1992 Fuller et al.
5,191,310 A 3/1993 Obermann et al.
5,467,523 A * 11/1995 Seaman ....................... 29/622
5,585,774 A * 12/1996 Bennett ...................... 337/365

FOREIGN PATENT DOCUMENTS

FR 2720144 A3 * 11/1995 ........... F25D/21/08
GB 2049139 A * 12/1980 ........... F25D/21/00

* cited by examiner

*Primary Examiner*—Anatoly Vortman
(74) *Attorney, Agent, or Firm*—Karl A. Vick, Esq.; Armstrong Teasdale LLP

(57) ABSTRACT

A temperature responsive switch includes a housing, an actuator arm for movement in response to temperature conditions, a movable contact, and an adjustable contact connected to a defrost terminal for completing a defrost circuit on demand without requiring a separate switch. The movable contact engages and disengages the defrost contact to cycle a defroster on and off in response to temperature changes in an evaporator tube, and also engages a stationary contact to complete a compressor circuit and cycle a compressor on and off in response to changes in an evaporator tube.

12 Claims, 4 Drawing Sheets

DEFROST ON DEMAND THERMOSTAT

CROSS REFERENCE TO RELATED APPLICATION

This application claims the benefit of U.S. Provisional Application No. 60/154,998, filed Sep. 21, 1999.

BACKGROUND OF THE INVENTION

This invention relates generally to condition-responsive switches and, more particularly, to a defrost on demand thermostat for deicing an evaporator surface.

Switches that are responsive to temperature changes, commonly known as thermostats or cold controls, are used in refrigeration systems, such as refrigerators, freezers, air conditioning systems, and heat pumps for controlling the temperature of air in a compartment, room, building, etc. These thermostats regulate the switching cycle of a compressor in response to the temperature of the air contained at a remote location. When the temperature exceeds a certain "turn-on" point, the switch contacts are closed and the compressor is switched on to cool the air. When the temperature drops below a certain "turn-off" point, the switch contacts are opened and the compressor is switched off.

The compressor receives a refrigerant from an evaporator, which typically operates at sub-freezing temperatures. Therefore, the surface of the evaporator often becomes frosted or covered with ice, which insulates the evaporator and prevents it from absorbing heat, thereby negatively affecting the efficiency of the refrigerator system. From time to time, the evaporator may be defrosted according to known methods, but typically only after long periods of inefficient use because of ice build-up on the evaporator. In addition, if ice is allowed to build-up on the evaporator, the defrost cycle time increases. Also, temporary relief of conventional evaporator defrost is usually short-lived as the evaporator quickly becomes frosted again. While separately controlled defrost mechanisms exist, they increase the costs of the system as well as complicate assembly.

Accordingly, it would be desirable to provide a thermostat that controls the application of a defrost cycle to defrost the evaporator surface as needed, or on demand, to prevent excessive ice buildup on the evaporator surface, to reduce the costs of separate switches to control a defrost mechanism, and to simplify the assembly of refrigeration systems.

BRIEF SUMMARY OF THE INVENTION

In an exemplary embodiment of the invention, a condition responsive electric switch includes a housing, an actuator arm, a movable electrical contact, and an adjustable electrical contact for completing a defrost circuit. The actuator arm is mounted within the housing for pivotal movement that moves the movable contact and opens and closes the movable and adjustable electrical contacts to complete or to break a defrost circuit through the switch in response to the temperature of an evaporator tube connected to an evaporator.

When the evaporator tube ices over, the temperature of the evaporator tube drops, causing a refrigerant inside a bellows and in fluid communication with the evaporator tube to contract and move the actuator arm, which causes the movable contact to engage the adjustable contact and complete a circuit through a defrost mechanism known in the art. As the temperature of the evaporator tube rises due to defrost of the evaporator, the refrigerant expands in the bellows and causes the actuator arm to move and disengage the movable contact from the adjustable contact. Thus, an automatic defrost on demand switch control is provided that defrosts an evaporator on an as needed basis, making the system more efficient.

The position of the adjustable contact relative to the movable contact is adjustable to calibrate the sensitivity of the defrost circuit to movement of the actuator arm. Thus, the defrost contact may be moved closer to or farther away from the movable contact to vary the required temperature change, or differential in the evaporator tube temperature to engage the movable contact and the defrost contact and close the defrost circuit. The smaller the separation of the movable contact and the defrost contact, the smaller the temperature differential in the evaporator tube that will close the contacts.

DETAILED DESCRIPTION OF THE INVENTION

Figure 1:
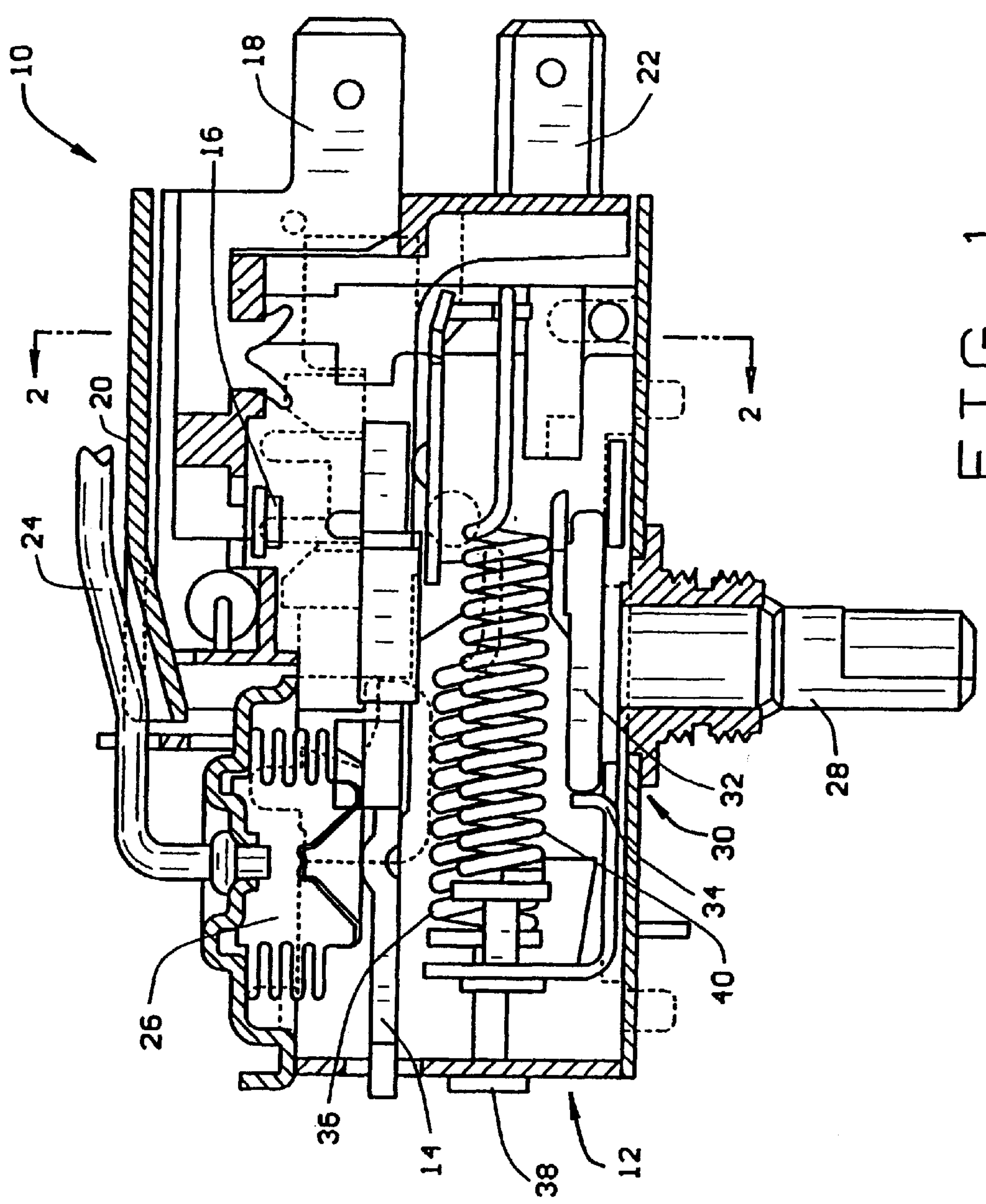
FIG. 1 is a cross-sectional view of a refrigerator thermostat.

FIG. 1 is a partial cross sectional view of a condition responsive electric switch, or thermostat 10. Thermostat includes a housing 12, an actuator arm 14, a movable electrical contact (not shown in FIG. 1), and an adjustable defrost contact 16 for completing a defrost circuit (not shown) through a defrost terminal 18 extending through housing 12.

Housing 12 includes an insulated housing portion 20, a first terminal (not shown in FIG. 1), a second terminal (not shown in FIG. 1), and a pair of ground terminals 22 for plug-in connection to an electric circuit, such as, for example, a power circuit for a compressor (not shown). The power circuit is broken and completed through the first and second terminals by the operation of a bistable spring switch (not shown in FIG. 1).

Actuator arm 14 is pivotally mounted within housing 12 for a rocking movement that manipulates the bistable spring switch to engage or disengage the electrical contacts in response to environmental conditions outside housing 12, such as a temperature at a designated location. In a particular embodiment of the invention, a capillary tube 24 fluidly communicates with an evaporator tube (not shown) connected to an evaporator (not shown). A bellows 26 and capillary tube 24 are charged with an operating fluid, such as a refrigerant gas, that expands and contracts due to temperature changes in the evaporator tube. As the operating fluid expands and contracts, bellows 26 move actuator arm 14, which transmits the movement of bellows 26 to the bistable spring switch to actuate the switch between circuit open and circuit closed positions.

A shaft 28 extends partially through housing 12 and is rotatable for adjustment of the temperature conditions that cause actuator arm 14 to cycle the compressor on and off. Shaft 28 has an OFF position, a WARM position, and a COLD position. In the OFF position, the electrical contacts of the switch are forced apart and the switch is unresponsive to temperature changes in the evaporator tube.

In an ON position, i.e., not in the OFF position, shaft 28 may be rotated to any desired setting between the WARM position and the COLD position to vary the temperature of the air in, for example, a refrigerator compartment.

A cam assembly 30 includes a cam 32 within housing 12 and connected to shaft 28, and a spring loaded cam follower 34 connected to actuator arm 14. Hence, a primary bias spring 36 connects cam follower 34 to actuator arm 14 and serves both to bias actuator arm 14 against movement and to keep cam follower 34 in contact with cam 32. A screw 38 allows primary bias spring 36 to be calibrated to preset factory specifications during manufacture of thermostat 10 so that actuator arm 14 will pivot appropriately at desired temperature ranges. A secondary spring 40 also biases actuator arm against movement.

Figure 2:
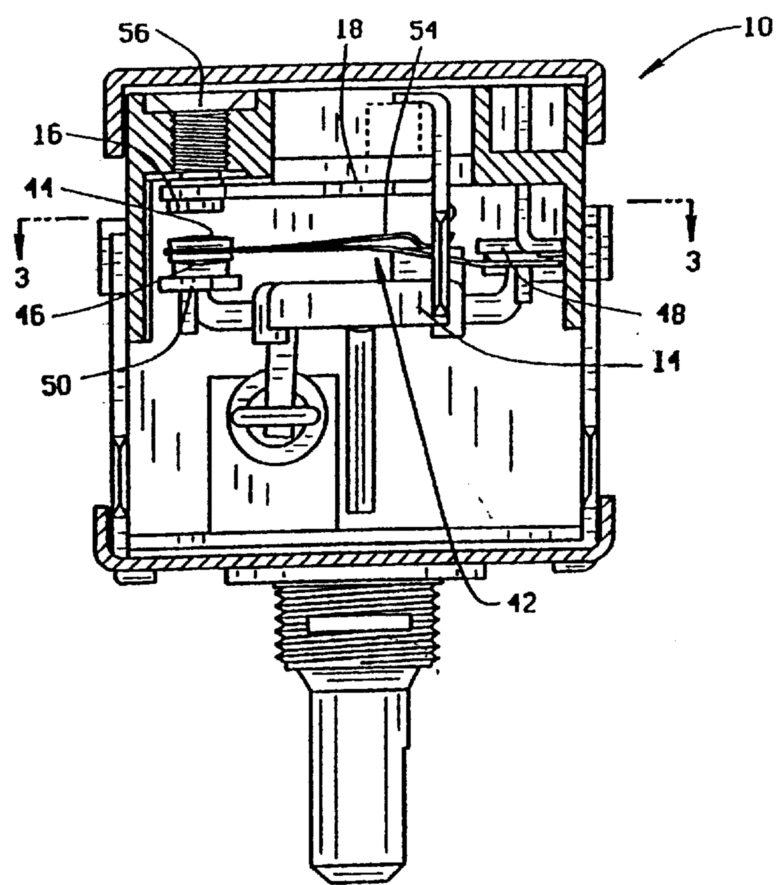
FIG. 2 is a cross-sectional view with parts removed along line 2—2 of FIG. 1.

FIG. 2 is a cross-sectional view of FIG. 1 including actuator arm 14 communicating with a bistable spring switch element 42. A movable contact 44 engages and disengages a stationary contact 46 to complete an electrical connection between a first terminal 48 and a second terminal 50. Movable contact 44 also engages and disengages defrost contact 16 located on defrost terminal 18 to complete an electrical connection through first terminal 15 and defrost terminal 18. A tongue 54 of bistable spring switch element 42 interfaces with actuator arm 14 and causes snap action movement, further explained below, of movable contact 44 as actuator arm 14 pivots in response to temperature changes of the operating fluid in bellows 26 (shown in FIG. 1), which in a particular embodiment is in communication with and therefore directly correlated to the temperature of an evaporator tube.

The position of defrost contact 16 relative to stationary contact 46, and also relative to movable contact 44, is adjustable with an adjust screw 56 extending through housing 12. Adjust screw 56 contacts defrost terminal 52 and deflects defrost terminal 52 to vary the separation of defrost contact 16 and stationary contact 46. As the separation of contacts 16, 46 decreases, a lesser movement of actuator arm 14 is required to engage movable contact 44 and defrost contact 16, which corresponds to a lesser temperature change, or temperature differential, in the evaporator tube. In other words, the defrost circuit through thermostat 10 becomes more sensitive to changes in temperature of the evaporator tube as the separation between contacts 16, 46 becomes smaller. Thus, the defrost efficacy can be adjusted by turning adjust screw 56 and increasing or decreasing the separation of contacts 16, 46.

In alternative embodiments, a round or polygonal adjustment member (not shown) is press fit into an aperture (not shown) through thermostat housing 12 and engages defrost terminal 18 for adjustment of the position of defrost contact 16 by pushing on the adjust member. In another alternative embodiment, the position of defrost contact 16 is adjustable by mechanically bending defrost terminal 18.

Figure 3:
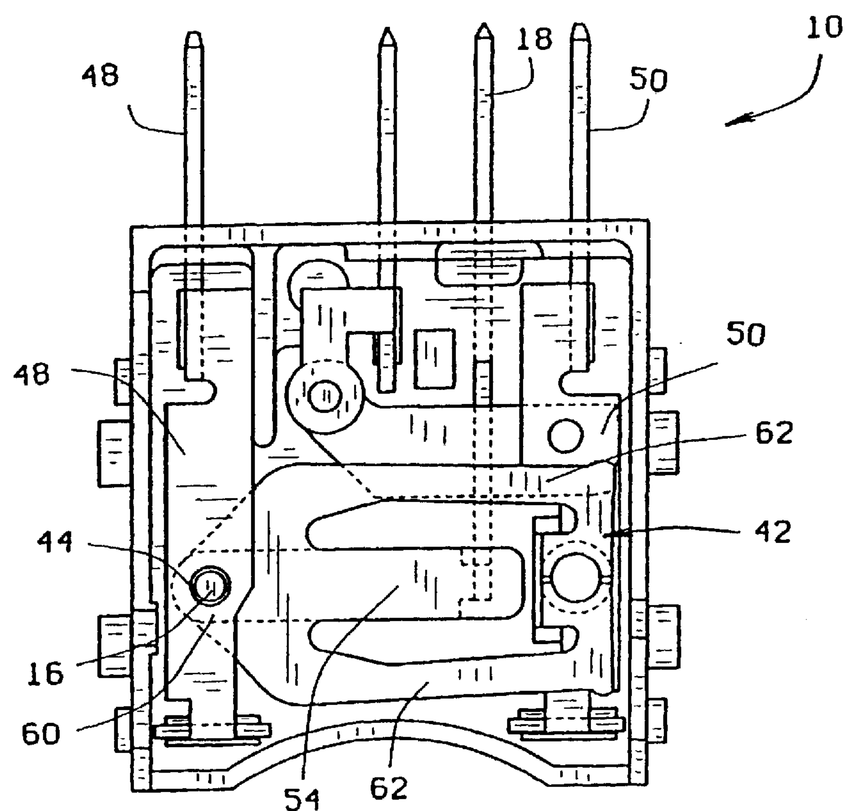
FIG. 3 is a cross sectional view with parts removed along line 3—3 of FIG. 2.

FIG. 3 illustrates bistable spring switch element 42 operated by actuator arm 14 (shown in FIGS. 1 and 2). Bistable spring switch element 42 selectively opens and closes an electrical circuit between first terminal 48 and second terminal 50. Bistable spring switch element 42 is fixedly connected to first terminal 48 and carries moveable contact 44 that is selectively engageable with stationary contact 46 (shown in FIG. 2) that is located on second terminal 50. Defrost terminal 18 is positioned between first terminal 48 and second terminal 50, and includes defrost contact 16 (shown in FIG. 2) for engagement with movable contact 44.

Bistable spring switch element 42 includes a head 60 on which movable contact 44 is mounted, and a pair of arms 62 extending outwardly from head 60. Tongue 54 extends outwardly from head 60 and is positioned between arms 62. As bellows 26 (shown in FIG. 1) expand and contract, actuator arm 14 (shown in FIGS. 1 and 2) engages and moves tongue 54 upward and downward. As the evaporator tube temperature rises, bellows 26 expand due to the expanding operating fluid therein and cause actuator arm 14 to push tongue 54 upward so that bistable spring switch element 42 snaps into a convex configuration that engages movable contact 44 and stationary contact 46, completing an electrical circuit through first and second terminals 48, 50, respectively. As the evaporator tube temperature falls, bellows 26 contract due to the contracting operating fluid therein. As bellows 26 contract, tongue 54 is moved downward, and bistable spring switch element 42 snaps into a concave configuration that separates contacts 44, 46 and opens the circuit between first and second terminals 48, 50. When first and second terminals 48, 50 are connected to a compressor circuit (not shown), bistable spring switch element 42 therefore cycles a compressor on and off in response to the temperature of the evaporator tube.

As evaporator tube temperature continues to fall, the concave curvature of bistable spring switch element 42 becomes more pronounced and movable contact 44 moves toward defrost contact 16. Eventually, movable contact 44 engages defrost contact 16 and completes a circuit through first terminal 48 and defrost terminal 18. When first terminal 48 and defrost terminal 18 are connected to a defrost circuit (not shown), bistable spring switch element 42 therefore cycles a defrost heater on and off to de-ice the evaporator surface.

Figure 4:
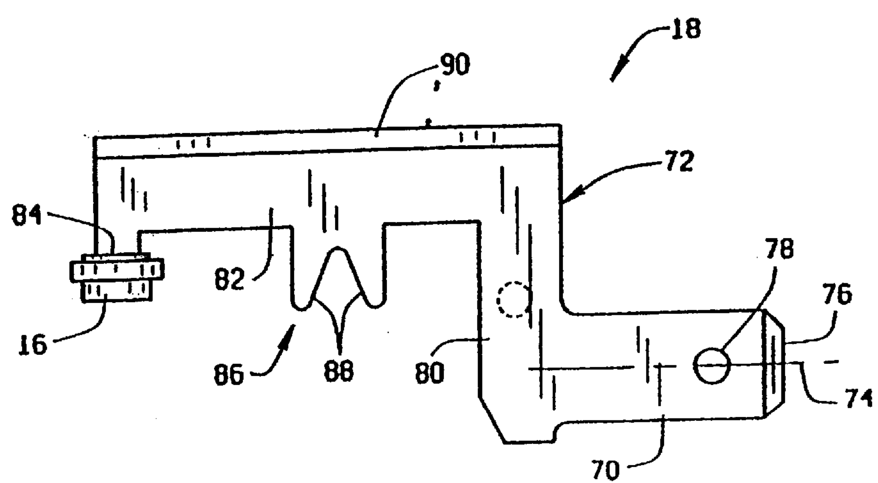
FIG. 4 is a front view of the defrost terminal shown in FIG. 1.

FIG. 4 is a front view of defrost terminal 18 including a blade portion 70, a connecting portion 72, and defrost contact 16 positioned above blade portion 70. Blade portion 70 extends along a first longitudinal axis 74 and includes a tapered leading edge 76 and an aperture 78. Planar connector portion 72 includes a first portion 80 that is substantially perpendicular to and extends away from first longitudinal axis 74, a second portion 82 that is substantially parallel to first longitudinal axis 74, and a third portion 84 substantially perpendicular to second portion 82 and extending toward first longitudinal axis 74. A bifurcated stake 86 extends from second portion 82 for connection to switch housing 12 (FIG. 1). Stake 86 is inserted through a housing aperture and forks 88 are separated from one another to hold defrost terminal 18 in position relative to housing 12 as shown in FIG. 1. A ledge 90 extends from and perpendicular to second portion 82 and supports said defrost terminal 18 inside housing 12, as also illustrated in FIG. 1.

Defrost terminal 18 is fabricated from brass and is integrally formed according to known methods. Alternatively, defrost terminal 18 could be made from other electrically conducting materials known in the art. In alternative embodiments, other connection mechanisms known in the art are used in lieu of stake 86 to connect defrost terminal to switch housing.

Figure 5:
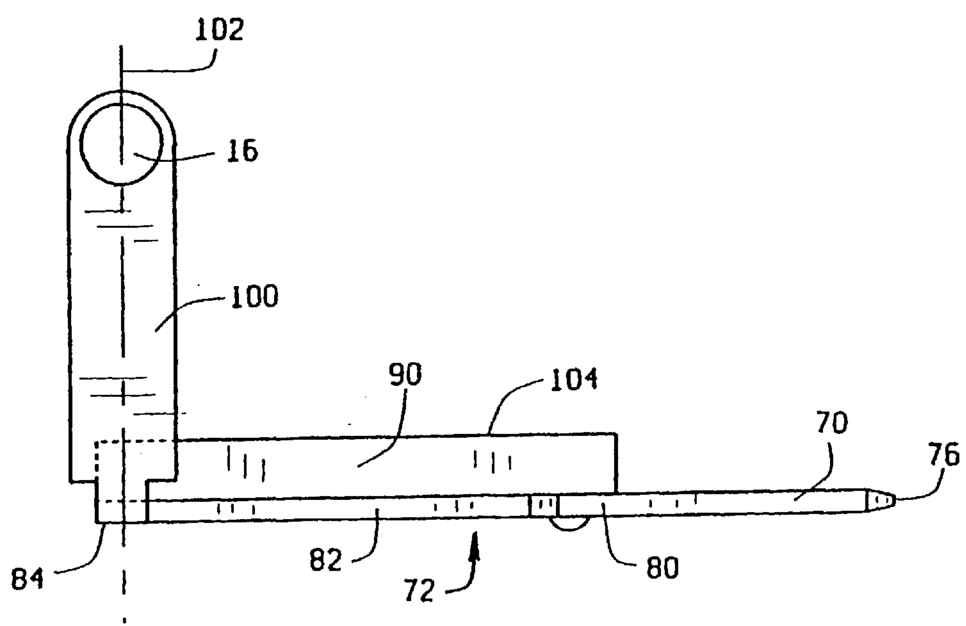
FIG. 5 is a bottom view of the defrost terminal shown in FIG. 1.

FIG. 5 is a bottom view of defrost terminal 18 illustrating coplanar blade portion 70 and connector portion first portion 80, second portion 82, and third portion 84, together with an arm portion 100 extending from connector second portion 82 and distancing defrost contact 16 from connector portion 72 along a second longitudinal axis 102. Second longitudinal axis 102 is substantially perpendicular to first longitudinal axis 74 that extends through blade portion 70 and blade portion beveled leading edge 76. Ledge 90 extends from connector portion 72, and includes a leading edge 104 that is generally parallel to first longitudinal axis 74.

Figure 6:
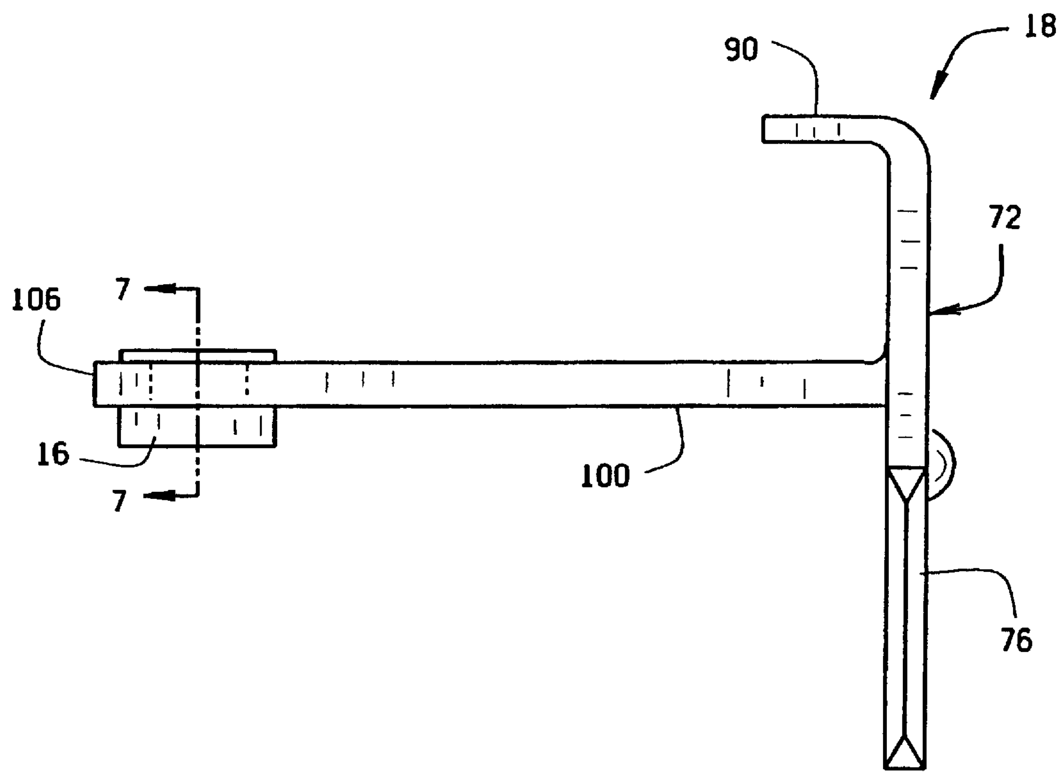
FIG. 6 is a side view of the defrost terminal shown in FIG. 1.

FIG. 6 is a side view of defrost terminal 18 including beveled blade portion leading edge 76, arm portion 100 extending transversely from connector portion 72, ledge 90 extending generally parallel to arm portion 100, and defrost contact 16 located on a distal end 106 of arm portion 100. Arm portion 100 extends as a cantilever beam from connector portion 72 and spans approximately the distance between first terminal 48 and second terminal 50 so that arm portion 100 generally extends above bimetal spring switch element tongue 54 (see FIG. 3) and positions defrost contact 16 in proximity with movable contact 44. When defrost contact 16 receives adjust screw 56 (shown in FIG. 2), arm portion 100 deflects to facilitate adjustment of defrost contact 16 position relative to stationary contact 46.

Figure 7:
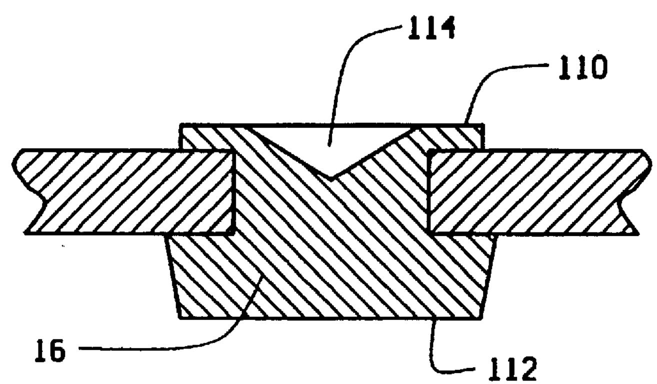
FIG. 7 is a cross sectional view along line 7—7 of FIG. 6.

FIG. 7 is a cross sectional view taken through defrost contact 16, and illustrating defrost contact first end 110 and second end 112. First end 110 includes a conical depressed surface 114 to accommodate a head (not shown in FIG. 7) of adjust screw 56 (see FIG. 2) and ensures engagement of adjust screw 56 (shown in FIG. 2) and defrost contact 16.

Thus, a defrost on demand thermostat is provided for automatic, efficient, and timely defrost of an evaporator. Consequently, the costs of a separate defrost switch is saved, and assembly of the system is simplified.

While the invention has been described in terms of various specific embodiments, those skilled in the art will recognize that the invention can be practiced with modification within the spirit and scope of the claims.

What is claimed is:

1. A method for automatic defrost of an evaporator surface using a condition responsive electric switch, the switch including an adjustable defrost terminal, a movable contact communicating with an actuator arm, and a bellows connected to the actuator arm and having an operating fluid therein, said method comprising the step of:

connecting the bellows to the evaporator surface so that the operating fluid expands and contracts with changes in temperature of the evaporator surface, thereby causing the bellows to expand and contract as the operating fluid expands and contacts and moving the actuator arm to engage and disengage the movable contact and the defrost contact to complete or break a defrost circuit in response to the temperature of the evaporator surface.

2. A method in accordance with claim 1 wherein said step of connecting the bellows comprises the step of connecting a capillary tube between the bellows and an evaporator tube connected to the evaporator surface.

3. A method in accordance with claim 1 further comprising the step of adjusting the position of defrost contact relative to the movable contact to increase or decrease a separation between the defrost contact and the movable contact, thereby adjusting a calibration of the switch and controlling the sensitivity of the defrost circuit to changes in evaporator surface temperature.

4. A method in accordance with claim 3 wherein the step of adjusting the position of the defrost contact comprises the steps of deflecting a defrost terminal connected to the defrost contact.

5. A method in accordance with claim 4 wherein said step of deflecting the terminal comprises turning an adjust screw in contact with the defrost terminal.

6. A method for automatic defrost of an evaporator surface using a condition responsive electric switch, the switch including a movable contact communicating with an actuator arm for pivotal movement responsive to a temperature of the evaporator surface, said method comprising the steps of:

positioning a defrost contact relative to the movable contact so that the actuator arm engages and disengages the moveable contact and the defrost contact to complete or break a defrost circuit in response to the temperature of the evaporator surface; and adjusting the position of defrost contact relative to the movable contact to increase or decrease a separation between the defrost contact and the movable contact, thereby adjusting a calibration of the switch and controlling the sensitivity of the defrost circuit to changes in evaporator surface temperature.

7. A method in accordance with claim 6 wherein the switch includes a movable contact communicating with an actuator arm and bellows connected to the actuator arm, the bellows having an operating fluid therein, said method further comprising the step of:

connecting the bellows to the evaporator surface so that the operating fluid expands and contracts with changes in temperature of the evaporator surface, thereby causing the bellows to expand and contract as the operating fluid expands and contacts and moving the actuator arm to engage and disengage the movable contact and the defrost contact.

8. A method in accordance with claim 7 wherein said step of connecting the bellows comprises the step of connecting a capillary tube between the bellows and an evaporator tube connected to the evaporator surface.

9. A method in accordance with claim 6 wherein the step of adjusting the position of the defrost contact comprises the steps of deflecting a defrost terminal connected to the defrost contact.

10. A method in accordance with claim 9 wherein said step of deflecting the terminal comprises turning an adjust screw in contact with the defrost terminal.

11. A condition responsive electric switch comprising:

a first terminal and a second terminal for connection to a compressor circuit;

a defrost terminal, said first terminal and said defrost terminal for connection to a defrost circuit;

a temperature responsive movable contact to complete or break an electrical connection between said first and second terminals and between said first and defrost terminals; and a defrost contact connected to said defrost terminal, said defrost terminal adjustable to vary the separation between said defrost contact and said movable contact.

12. A condition responsive electric switch in accordance with claim 11 further comprising:

a housing, said first, second and defrost terminals extending through said housing;

an actuator arm mounted in said housing, said arm pivoting in response to environmental conditions outside said housing; and said movable contact communicating with said actuator arm.

* * * * *

UNITED STATES PATENT AND TRADEMARK OFFICE

CERTIFICATE OF CORRECTION

PATENT NO. : 6,525,641 B1
DATED : February 25, 2003
INVENTOR(S) : James P. Frank It is certified that error appears in the above-identified patent and that said Letters Patent is hereby corrected as shown below:

Column 3,
Line 30, delete "15" and insert therefor -- 48 --.
Lines 43 and 44, delete "52" and insert therefor -- 18 --.

Column 6,
Line 30, delete "fluid expands and contacts" and insert therefor -- fluid expands and contracts --.

Signed and Sealed this

Twenty-sixth Day of August, 2003

JAMES E. ROGAN
*Director of the United States Patent and Trademark Office*